US008037241B2

(12) United States Patent
Rosker et al.

(10) Patent No.: US 8,037,241 B2
(45) Date of Patent: Oct. 11, 2011

(54) VIDEO-STORAGE NETWORK HAVING INCREASED PERFORMANCE

(75) Inventors: Steven Brian Rosker, Lexington, MA (US); Charles Todd Singer, North Reading, MA (US)

(73) Assignee: GVBB Holdings S.A.R.L., Luxembourg (LU)

( * ) Notice: Subject to any disclaimer, the term of this patent is extended or adjusted under 35 U.S.C. 154(b) by 1323 days.

(21) Appl. No.: 10/525,921

(22) PCT Filed: Aug. 21, 2003

(86) PCT No.: PCT/US03/26128
§ 371 (c)(1),
(2), (4) Date: Feb. 25, 2005

(87) PCT Pub. No.: WO2004/021196
PCT Pub. Date: Mar. 11, 2004

(65) Prior Publication Data
US 2006/0041717 A1    Feb. 23, 2006

Related U.S. Application Data

(60) Provisional application No. 60/406,623, filed on Aug. 28, 2002.

(51) Int. Cl.
*G06F 13/14* (2006.01)
(52) U.S. Cl. .. 711/113; 711/114; 711/136; 711/E12.053
(58) Field of Classification Search .................. 711/113, 711/136, 114
See application file for complete search history.

(56) References Cited

U.S. PATENT DOCUMENTS

| 5,829,046 | A | 10/1998 | Tzelnic et al. |
| 6,463,509 | B1 | 10/2002 | Teoman et al. |
| 6,792,507 | B2* | 9/2004 | Chiou et al. .................. 711/119 |
| 2001/0047400 | A1 | 11/2001 | Coates et al. |
| 2002/0184460 | A1* | 12/2002 | Tremblay et al. ............. 711/167 |
| 2002/0194429 | A1 | 12/2002 | Chiu et al. |

FOREIGN PATENT DOCUMENTS

| JP | 11-338748 | 12/1999 |
| JP | 2004-535089 | 11/2004 |
| WO | WO 00/75786 | 12/2000 |
| WO | WO 02/065299 | 8/2002 |

OTHER PUBLICATIONS

Federighi et al., "A Distributed Hierarchical Storage Manager for a Video-on-Demand System," Storage and Retrieval for Image and Video Databases II, IS&T/SPIE Symp. On Elec. Imaging Sci. & Tech., San Jose, CA, Feb. 1994, XP-002366113.

(Continued)

*Primary Examiner* — Kenneth M Lo
(74) *Attorney, Agent, or Firm* — Arent Fox LLP

(57) ABSTRACT

A video storage system includes a storage area network and at least one local cache storage unit. Both the storage mechanism and the local cache storage unit store at least some content in common. In response to a react request, a read director determines which of the storage mechanism and local cache storage unit contains the requested content. Upon determining that the requested content resides on the local cache storage unit, the read director directs the content request to the local cache storage unit, thereby reducing the demand on the storage mechanism. If the content does not reside on the local cache storage unit, read director directs the request to the storage mechanism, but if the content is unavailable, the content request will be filled with filler data from a filler data source.

16 Claims, 1 Drawing Sheet

OTHER PUBLICATIONS

Birk, "Deterministic Load-Balancing Schemes for Disk-Based Video-On-Demand Storage Servers," Fourteenth IEEE Symposium on Mass Storage Systems, 1995, pp. 17-25, XP-10194177.

Sarizopoulos et al., "Hierarchical Caching and Prefetching for Continuous Media Serviers with Smart Disks," IEEE 2000, pp. 16-22, XP-000976114.

Search Report Dated Nov. 25, 2003.

\* cited by examiner

VIDEO-STORAGE NETWORK HAVING INCREASED PERFORMANCE

CROSS REFERENCE TO RELATED APPLICATION

This application claims the benefit, under 35 U.S.C. §365 of International Application PCT/US03/26128, filed Aug. 21, 2003, which was published in accordance with PCT Article 21(2) on Mar. 11, 2004 in English and which claims the benefit of U.S. provisional patent application No. 60/406,623, filed Aug. 28, 2002.

TECHNICAL FIELD

This invention relates to a video storage network for storing video information.

BACKGROUND ART

In the past, video editing occurred on stand-along devices, typically videotape machines. An editor seeking to create a video segment comprised of separate clips would queue the clips in the desired order on one or more source machines and then select desired clip for recording. The advent of shared video storage greatly changed the manner in which video editing now occurs. With present day shared storage networks, multiple users can each edit a copy of the same content using non-linear editing techniques. Many present-day video storage networks often place limits on the number of users because of bandwidth constraints. The switch fabric of such video storage networks often will not allow more than a limited number of users to access the storage facility. Overcoming this drawback by providing additional links increases overall cost.

Thus, there is need for a technique for providing a shared video storage system that overcomes the aforementioned disadvantage.

BRIEF SUMMARY

Briefly, in accordance with a preferred embodiment, there is provided a storage system for storing content, and preferably, video files. The storage system of the present principles includes a storage mechanism, a large disk drive, or one or more Redundant Arrays of Inexpensive Disk Drives (RAIDs). The storage system further includes at least one local cache storage unit for mirroring at least a portion of the content stored on the storage mechanism. Thus, a user can obtain such mirrored content from the local cache storage unit rather than the storage mechanism, thus reducing the bandwidth demands on the storage mechanism. A write director is coupled to the storage mechanism and the one local cache storage unit for controlling the incoming content written into the storage mechanism and the local cache storage unit. A cache manager manages the content coherency between the storage mechanism and the local cache storage unit so that at least some of the content on the storage mechanism also exists on the local cache storage unit and vice versa. A read director responds to a content request from a user and directs the request to one of the storage mechanism and the local cache storage unit depending on the content availability of each. In this way, if the content is available on the local cache storage unit, the user reads from that unit rather than the storage mechanism. A storage mechanism access manager monitors the reading of content from, and the writing of content to the storage mechanism to control the read and write managers accordingly.

DETAILED DESCRIPTION

Figure 1:
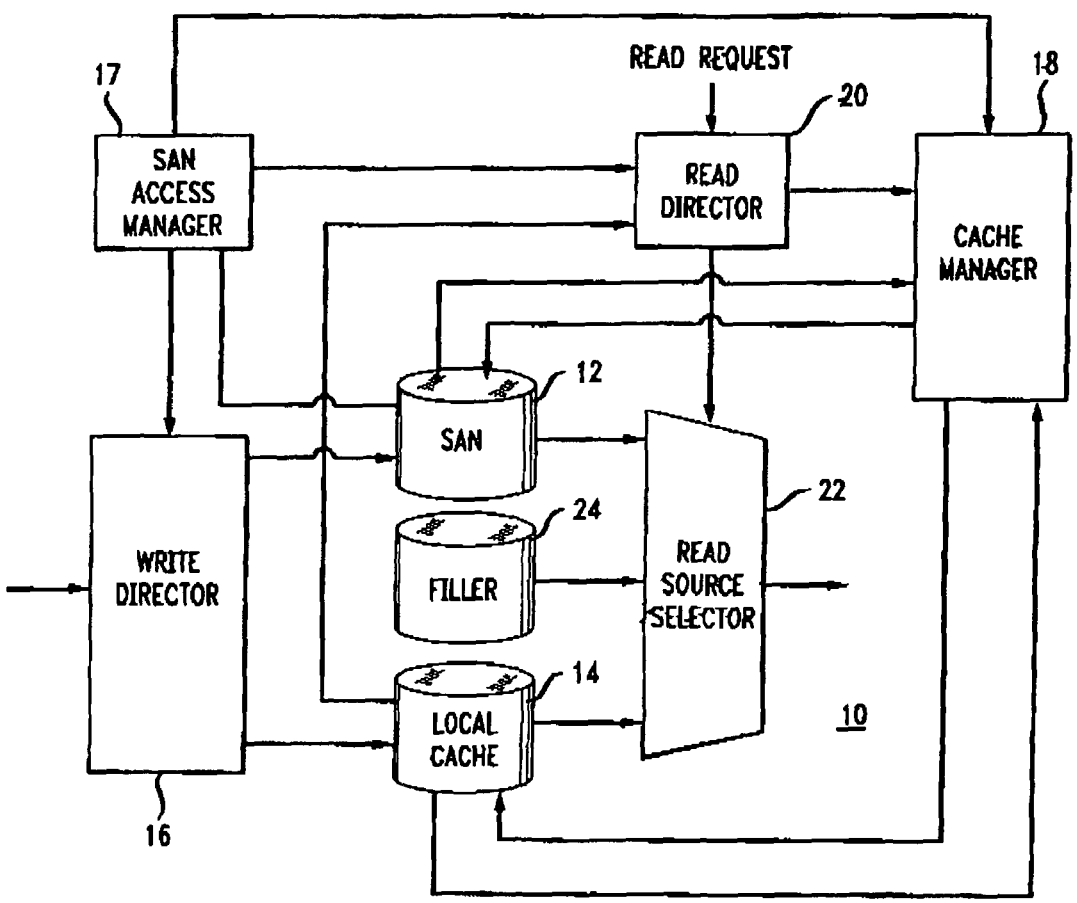
FIG. 1 depicts a block schematic diagram of a storage system in accordance with a preferred embodiment of the present principles.

FIG. 1 depicts a storage system 10 in accordance with a preferred embodiment of the present principles that affords improved efficiency. At its heart, the storage system 10 includes a storage mechanism 12 comprised of a single disk drive, or one or more Redundant Arrays of Inexpensive Disk Drives (RAIDs) that receive content for subsequent access by a user. Typically, the storage mechanism 12 stores video files with or without embedded audio for editing and/or broadcast. Having all users access the storage mechanism 12 at any given time will constrain bandwidth, thus imposing limitations on the maximum number of users. To overcome this disadvantage, the storage system 10 of the present principles also includes at least one local cache storage unit 14, and preferably, a plurality of such units. Each local cache storage unit 14 typically takes the form of a disk drive or one or more RAIDs.

As discussed in greater detail below, the local cache storage unit 14 mirrors at least some of the content stored on the storage mechanism 12. In other words, the local cache storage unit 14 stores at least some of the same files as the storage mechanism 12. In this way, a user seeking to access a particular file stored both on the storage mechanism 12 and on the local cache storage unit 14 can access the local cache storage unit rather than the storage mechanism. Accessing the local cache storage unit 14 reduces bandwidth demand on the storage mechanism 12. In practice, different groups of users each can have a dedicated local cache storage unit. Alternatively, assignment of a local cache storage unit 14 to a group of users can occur on a dynamic basis.

A write director 16 controls the writing of input content from an external source (not shown) to each of storage mechanism 12 and the local cache. Such input content can include live video received from a camera or a satellite feed, or previously recorded video. In practice, the write director 16 takes the form of a programmed processor, hard-wired logic circuit, or field programmable array (FPGA) or the like that responds to control information received from a storage mechanism access manager 17 that monitors the read and write load on the storage mechanism 12. In practice, the storage mechanism Access Manager 17 takes the form of a programmed processor, hard-wired logic circuit, or field programmable array (FPGA). In accordance with the output signal from the storage mechanism Access Manager 17, the write director 16 directs incoming content to either or both of the storage mechanism 12 and the local cache storage unit 14.

A cache manager 18, typically in the form of a programmed processor, hard-wired logic circuit, or field programmable array (FPGA) or the like, controls the writing of content between the local cache storage unit 14 and the storage mechanism 12 in accordance with control signals from the local cache storage unit to maintain content coherency. In other words, the cache manager 18 maintains at least some content in common on the storage mechanism 12 and the local cache storage unit 14. To accomplish this task, the cache manager 18 undertakes background copying of files to the local cache storage unit 14 from the storage mechanism 12 ("trickle down"). Likewise, the cache manager 18 undertakes background copying of files to the storage mechanism 12 from the local cache storage unit 14 ("trickle up"). Such trickle up becomes necessary when a user edits content for subsequent use by others. The rate at which "trickling down" and "trickling up" occurs is a function of the overall bandwidth demand on the storage mechanism 12. The cache manager 18 also manages the storage capacity of the local cache storage unit 14 by deleting infrequently accessed files. Should the available storage capacity of the local cache storage unit 14 exceed a prescribed level, the cache manager 18 will delete the least recently accessed file first. Thereafter, the cache manager 18 will delete the next least recently accessed file and so on until the available storage capacity of the local cache storage unit 14 reaches an acceptable level.

To read content from the storage system 10, a user enters a read request received by a read director 20. In practice, the read director 20 takes the form of a programmed processor that monitors the content on both the storage mechanism 12 and the local cache storage unit 14. Upon receipt of a read request, the read director 20 determines whether the requested content resides on the local cache storage unit 14. If so, the read director 20 sends a command to a read source selector 22, typically a multiplexer, to designate the local cache storage unit 14 as the source of the requested content. Thus, under such circumstances, the read director 20 "redirects" the read request to the local cache storage unit 14. In the event the local cache storage unit 14 lacks the requested content, the read director 20 causes the source selector 22 to select the storage mechanism 12. Alternatively, the read director 20 will cause read source selector 22 to select a storage unit 24 provide the user with filler content in the event the local cache storage unit 14 can not provide the requested content and insufficient bandwidth exists to permit access to the storage mechanism 12. When the local cache storage unit 14 lacks the requested content, the read director 20 alerts the cache manager 18. In response, the cache manager 18 initiates a trickle down copy operation to transfer the content from the storage mechanism 12 to the local cache storage unit 14.

In operation, the storage system 10 advantageously offers improved performance by reducing bandwidth demands on the storage mechanism 12. The local cache storage unit 14 serves to mirror at least some of the content on the storage mechanism 12, thus providing an alternate source for supplying such content to a user. The cache manager 18 carefully manages the local cache storage unit 14 in response to the state of the storage mechanism 12, as monitored by the storage mechanism access manager 17, to assure that local cache storage unit will contain the requisite content. The storage mechanism access manager controls the reading of content from, and the writing of content to the storage mechanism during intervals of high bandwidth demand.

The foregoing describes a storage network having improved performance.

The invention claimed is:

1. A storage system, comprising:
   a storage mechanism for storing content; at least one local cache storage unit for mirroring at least a portion of the content stored on the storage mechanism;
   a write director coupled to the storage mechanism and to the at least one local storage cache for controlling content written into the storage mechanism and to the at least one local storage cache;
   a cache manager for managing content copying between the storage mechanism and the at least one local storage cache to maintain at least partial content coherency;
   a read director responsive to a request for content from a user for directing said content request to a selected one of the at least one local storage cache and the storage mechanism depending on content availability of each; and
   a storage mechanism access manager for monitoring read and write loading of the storage mechanism and for controlling the read and write directors and the cache manager in accordance with the storage mechanism read and write loading, wherein controlling the write directors includes reducing writing to the storage mechanism.

2. The storage system of claim 1 wherein the cache manager manages the storage capacity of the local cache storage unit by successively deleting a least accessed file until the local cache storage unit has an available storage capacity above a prescribed level.

3. The storage system of claim 1 further comprises a filler storage unit for storing filler content and wherein the read director directs the read request to the filler storage unit to provide filler content when the requested content is unavailable from the local storage cache unit and insufficient bandwidth exists to access the storage mechanism.

4. The storage system of claim 1 wherein the storage mechanism further comprises at least one disk drive.

5. The storage system of claim 1 wherein the storage mechanism further comprises at least one Redundant Array of inexpensive Disk Drives (RAID).

6. The storage system of claim 1 wherein the local cache storage unit further comprises at least one disk drive.

7. The storage system of claim 1 wherein the local cache storage unit further comprises at least one Redundant Array of inexpensive Disk Drives (RAID).

8. The storage system according to claim 1 wherein the read director redirects a request for content to the local cache storage unit when the requested content is available at the local cache storage unit to reduce bandwidth requirements on the storage mechanism.

9. The storage system according to claim 1 wherein the cache manager copies at least some content from the storage mechanism to the local cache storage unit previously unavailable on the local cache storage unit.

10. The system according to claim 1 wherein the storage mechanism access manager controls the read and write directors to reduce reading from and writing to the storage mechanism during intervals of limited storage mechanism bandwidth.

11. A method for storing content, comprising the steps of:
    writing incoming content to at least one of a Storage Area Network (storage mechanism) and a local cache storage unit;
    monitoring content coherency between the storage mechanism and the local cache storage unit;
    copying content between the storage mechanism and the local cache storage unit in accordance with the content coherency therebetween
    directing a request for content from a user to a selected one of the storage mechanism and the local cache storage unit depending on the content availability of each
    monitoring read and write loading of the storage mechanism; and
    controlling reading of content from, and writing of content to the storage mechanism in accordance with the storage mechanism read and write loading, wherein controlling includes reducing writing to the storage mechanism.

12. The method according to claim 11 wherein the step of directing the content request further comprises re-directing the content request to the local cache storage unit if the requested content resides at the local cache storage unit.

13. The method according to claim 11 wherein the step of directing the content request further comprises re-directing the content request to a filler storage unit to provide filler content if the requested content does not reside at the local cache storage unit and insufficient bandwidth exists to access the storage mechanism.

14. The method according to claim 13 further comprising the step of writing content from the storage mechanism to the local cache storage unit.

15. The method according to claim 11 further comprising the step of writing content from the local cache storage unit to the storage mechanism.

16. The method according to claim 11 wherein the step of controlling reading of content from, and writing of content to the storage mechanism further comprises the step of restricting access to the storage mechanism during intervals of high bandwidth demand.

* * * * *